United States Patent
Kobayashi et al.

(10) Patent No.: US 7,717,557 B2
(45) Date of Patent: May 18, 2010

(54) LENS SYSTEM AND METHOD WITH ANTIREFLECTIVE COATING

(75) Inventors: Kazuhiro Kobayashi, Ono (JP); Masao Yanagihara, Ono (JP)

(73) Assignee: Maui Jim, Inc., Peoria, IL (US)

( * ) Notice: Subject to any disclaimer, the term of this patent is extended or adjusted under 35 U.S.C. 154(b) by 682 days.

(21) Appl. No.: 11/540,499

(22) Filed: Sep. 29, 2006

(65) Prior Publication Data
US 2007/0258038 A1 Nov. 8, 2007

Related U.S. Application Data

(60) Provisional application No. 60/796,773, filed on May 2, 2006.

(51) Int. Cl.
*G02C 7/10* (2006.01)
*G02C 7/12* (2006.01)
(52) U.S. Cl. .......................... 351/163; 351/44; 351/177
(58) Field of Classification Search ............... 351/41, 351/44, 159, 163, 177
See application file for complete search history.

(56) References Cited

U.S. PATENT DOCUMENTS

| | | | |
|---|---|---|---|
| 4,161,547 A | 7/1979 | Kienel | |
| 4,161,560 A | 7/1979 | Kienel | |
| 5,694,240 A | 12/1997 | Sternbergh | |
| 5,719,705 A * | 2/1998 | Machol | 359/581 |
| 5,729,323 A | 3/1998 | Arden et al. | |
| 6,145,984 A * | 11/2000 | Farwig | 351/49 |
| 6,632,535 B1 | 10/2003 | Buazza et al. | |
| 6,793,339 B1 | 9/2004 | Yip et al. | |
| 6,794,066 B2 | 9/2004 | Macchi et al. | |
| 2003/0203991 A1* | 10/2003 | Schottman et al. | 523/334 |
| 2007/0030569 A1 | 2/2007 | Lu et al. | |

* cited by examiner

*Primary Examiner*—Scott J Sugarman
(74) *Attorney, Agent, or Firm*—Brinks Hofer Gilson & Lione

(57) ABSTRACT

An improved method is provided for applying an antireflective high contrast coating to a lens, as well as a lens system made with said method. By coating the lenses with a mixture of an oxide and fluoride, the transmission of undesirable visible light wavelengths is reduced, as is the reflection of undesirable light. This combination not only increases perceived sharpness and detail associated with viewing objects through the lenses, but also reduces undesirable reflected glare. Utilization of increased vacuum during the coating process reduces problems of humidity associated with plastic lenses. The combination of oxide and fluoride is controlled to reduce colored tint or hue in the resulting lenses. By imparting little to no color hue to the lenses, the lenses virtually eliminate any undesired color shift associated with prior art lenses.

20 Claims, 3 Drawing Sheets

LENS SYSTEM AND METHOD WITH ANTIREFLECTIVE COATING

CROSS-REFERENCE TO RELATED APPLICATIONS

This application claims priority to U.S. Provisional Application Ser. No. 60/796,773, filed May 2, 2006, which is incorporated herein by reference in its entirety.

FIELD OF THE INVENTION

The invention relates generally to a method for application of an antireflective coating and, in particular, to a method for application of an oxidic antireflective coating on lenses which minimizes undesirable color hue of the lenses.

BACKGROUND

Antireflective coatings on eyeglass lenses such as oxidic coatings are desirable as they reduce the amount of bounce-back glare from the interior or concave surface of the lenses to the user's eye. Such coatings are especially desirable in sunglasses, which typically are used where lighting conditions are more intense and/or include glare or other optically undesirable properties. In particular, it is desirable to minimize reflection on the "wearer's side" of a lens such that a wearer is less likely to see a reflection of his own eye in a sunglasses lens. Prior art lenses often have an antireflective coating comprising an oxide applied at a thickness that is one-quarter the wavelength of a particular light frequency for which it is desirable to minimize reflection. As a result of this coating, one portion of the light is reflected from the surface of the antireflective oxidic coating and another portion of the light is reflected back from the interface between the antireflective oxidic coating and the lens surface. This well-known phenomenon results in destructive interference wherein there are two reflected waves of light, with each one-half wave out of phase with the other. Because the two waves of reflected light are one-half wave out of phase with one another, they interfere with, and cancel each other out. This cancellation of what would otherwise be reflected light reduces perceived light reflection at the cancelled wavelength.

One drawback associated with the prior art is that these prior art antireflective coatings typically reduce reflection at only a single wavelength. Reducing reflection associated with only a single wavelength or narrow range of wavelengths may impart a perceived hue or color to the lens that is associated with a color complementary to the blocked wavelength or narrow wavelength range. For instance, glasses which block a wavelength associated with the blue end of the visible spectrum may impart a yellow hue due to the remaining reflected light which has not been cancelled out. Although it is known in the art to provide a plurality of coatings that impede a plurality of wavelengths, there is a need to provide a set of antireflective coatings sufficient that impart antireflective properties onto the surface of the lens, canceling reflection of certain wavelengths without imparting a color to the lens and without significantly altering the viewed colors of images seen through the lens.

Although it is known in the optics art to provide antireflective coatings associated with a wider band of visible light, and such coatings may be applied to high-end optics in expensive cameras or microscopes, the costs associated with such coatings have heretofor been cost-prohibitive for sunglasses or the like. In addition, another drawback associated with prior art antireflective coatings is their lack of abrasion resistance, which is an essential property for use in sunglasses lenses.

Additional drawbacks associated with prior art antireflective coatings come from the current processes of applying the coatings. Plastic lenses absorb moisture and gases. Such lenses may also release moisture and gases and may even change size as they are heated or cooled. Variation in humidity, as well as gas and moisture absorption often inhibits consistent application of prior art antireflective coatings on plastic lenses.

Still another drawback associated with prior art methods for application of antireflective coatings to plastic lenses is the inability of plastic lenses to withstand the high temperatures commonly associated with the application of antireflective coatings. Polarized films used in association with sunglasses and the like are also sensitive to high heat and may not be able to withstand the high heat associated with many prior art antireflective coating processes. It would, therefore, be desirable to provide a reproducible method for applying a durable antireflective coating to plastic lenses, including those with polarizing film(s), under conditions that do not damage the lenses or polarizing film(s).

It is also known in the art to provide lenses with high contrast coatings. By suppressing the transmission of certain wavelengths through the lens (e.g., wavelengths near the blue end of the visible light spectrum), the contrast associated with the transmitted light is increased. This increased contrast translates into a sharper image being transmitted to the lens-wearer. One drawback associated with prior art high contrast coatings, however, is that such high contrast coatings, like the antireflective coatings, typically impart a color to the transmitted image. In accord with well-known optics principles, this imparted color is complementary to the blocked wavelength, and it may affect the trueness of image color that a wearer can perceive through a lens. As a result, many prior art sunglasses lenses with antireflective coatings distort colors in a manner undesirable to many sunglasses-wearers. It would, therefore, be desirable to provide a coating to a lens that blocks certain shorter bands of wavelength in a manner that increases clarity without imparting a colored hue to the transmitted image.

The difficulties encountered in the prior art described hereinabove are addressed by the present invention.

SUMMARY OF THE INVENTION

In one aspect, the present invention includes a method for producing an antireflective coating is provided which is of a lower cost than prior methods. Embodiments of the present invention preferably include a method for providing an antireflective coating to lenses which maintains a near-neutral color for images transmitted through the lens, without significantly imparting other colors. Embodiments of the present invention preferably include a method for providing an antireflective coating to a lens which improves perceived clarity of transmitted images. Embodiments of the present invention preferably include a method for applying an antireflective coating to lenses with improved hardness and scratch resistance properties of the antireflective coating. Embodiments of the present invention preferably include a method for applying an antireflective coating to a lens which may be applied at a lower temperature than prior processes, thereby allowing non-destructive application to plastic lenses, including those having polarizing film components. Embodiments of the present invention preferably include a method for applying an antireflective coating to a lens which may be applied without damage to a polarized film associated with the lens Embodiments of the present invention preferably include a method for applying an antireflective coating to a lens which also imparts high contrast image transmission to the lens. In one preferred embodiment of the present invention, a method is provided which includes providing a lens with a first oxidic antireflective coating and a second antireflective coating containing an oxide or a fluoride. Additional coatings may be applied to provide increased contrast characteristics to the lenses. The coatings are preferably applied in a vacuum condition of $10^{-6}$ torr or less, over a period of approximately twenty to thirty minutes. Preferably, the coatings are combined in manner which does not impart an undesirable color to the lenses. A lower temperature of the lenses is maintained throughout the coating process to allow the process to be used in association with polarized plastic lenses. The present invention also includes lens systems made by the above methods.

DETAILED DESCRIPTION OF THE PREFERRED EMBODIMENT

Figure 1:
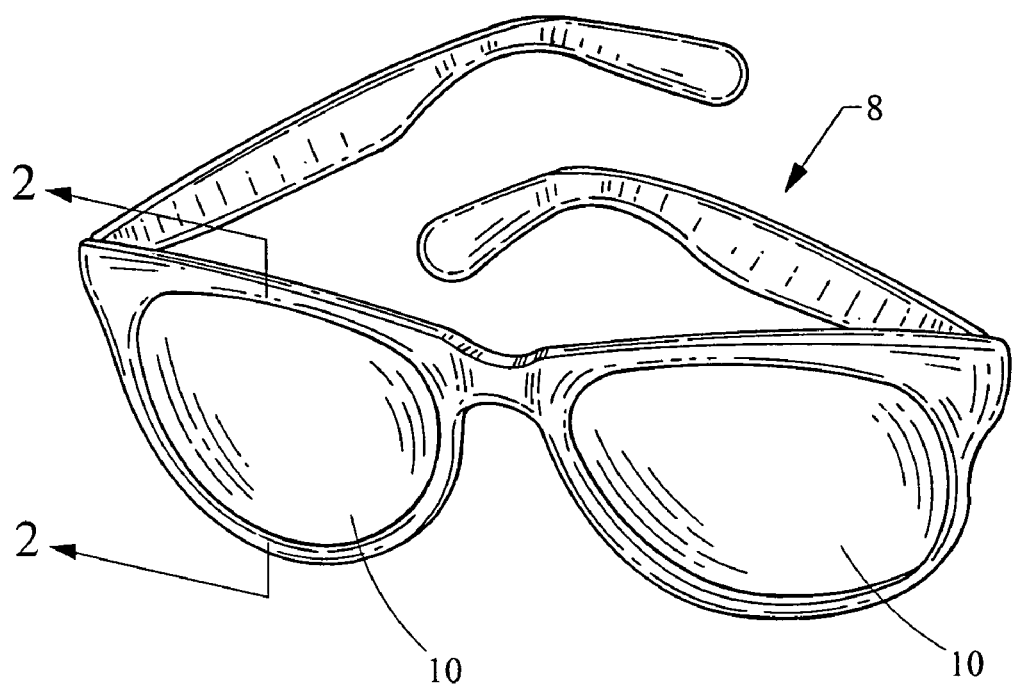
FIG. 1 illustrates a perspective view of a pair of sunglasses with lenses coated with an antireflective coating according to the method of the present invention.
Figure 2:
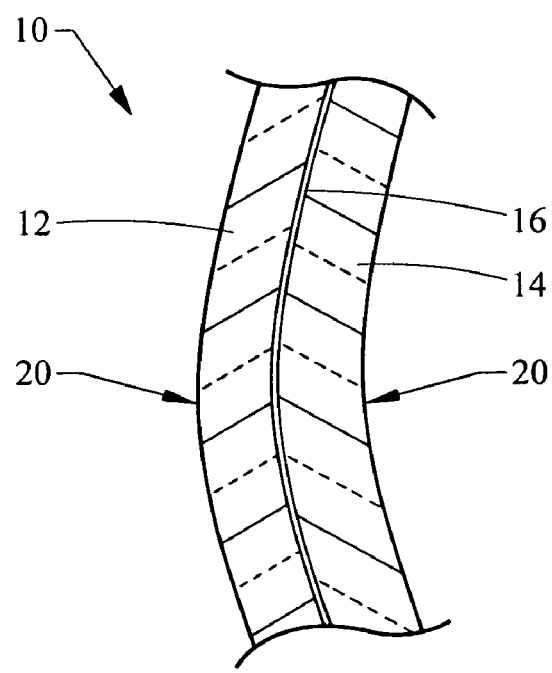
FIG. 2 illustrates a side elevation in cross-section of a sunglass lens element according to the present invention.

A pair of sunglasses (8) with lenses (10) prepared in accordance with the present invention are shown in FIG. 1. The lenses (10) preferably include an acrylic base, preferably polymethylmethacrylate. The lenses, of course, may be made of glass or any other suitable material known in the art for use in association with glasses or sunglasses (FIG. 1). As shown in FIG. 2, which is a diagrammatic cross-section along line 2-2 of FIG. 1, the lenses (10) comprise a first curved lens element (12) and a second curved lens element (14). The lens elements (12) and (14) are laminated on either side of a polarized film (16) by an adhesive or another suitable means.

Due to the sensitivity of the polarized film (16) to heat, the method of the present invention involving application of the antireflective coating most preferably is conducted at a temperature less than 200° C. After the lens elements (12) and (14) have been laminated to the polarized film (16), the lens (10) is provided with a hardcoat, such as that known in the art. The hardcoating may be applied using, for example, a thermally cured dip coating system, an ultraviolet light cured spin coating, or another suitable means known in the art.

After the hardcoating, the lens (10) is then washed in a sequence of eight baths. The first and second baths are detergent baths, such as those known in the art to remove dirt and debris from lenses. The baths preferably are maintained at about 20° C. and the lenses are maintained therein for 60 seconds each. The baths most preferably are provided with ultrasonic agitation to aid in cleaning the lenses (10). The third and fourth baths are provided with tap water preferably maintained at about 20° C. The fifth and sixth baths are purified water preferably maintained at about 40° C. The seventh and eighth baths are highly filtered pure water, preferably maintained at about 55-60° C. The lenses (10) are held in each bath for about 10 to about 200 seconds, more preferably 30-90 seconds, and most preferably about 60 seconds. It is preferable to maintain the first set of rinse baths (third and fourth baths) at a temperature of approximately 20° C. to most efficiently remove the detergent from the first and second baths.

Figure 3:
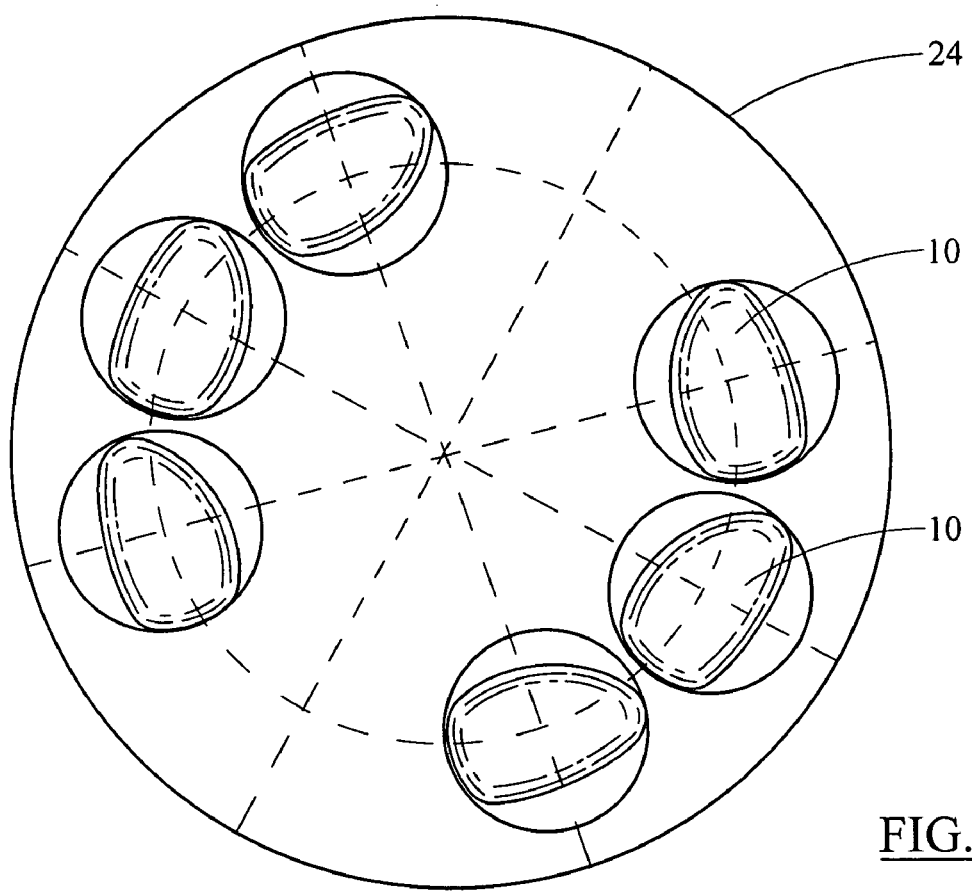
FIG. 3 illustrates a top elevation of a rotating deposition dome of the present invention.
Figure 4:
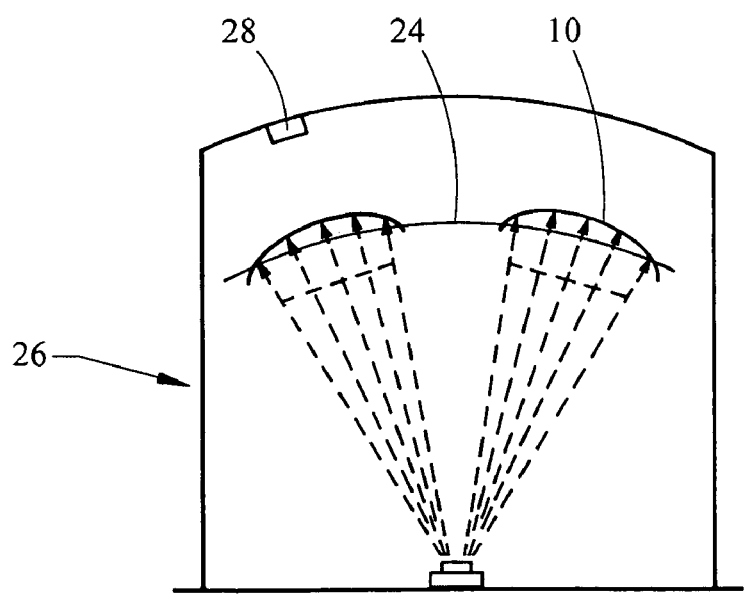
FIG. 4 illustrates a schematic representation of the lens coating process of the present invention.

After the last bath, the lenses (10) preferably are maintained at a temperature sufficient to reduce undesired expansion or contraction while they are moved to three subsequent stations for drying (which temperatures are known in the art for different lens compositions). A preferred temperature range is from about 20° C. to about 70° C. for polymethacrylate lenses. The lenses (10) are maintained at each station for about sixty seconds and the temperature of the lens (10) is acclimated to the temperature associated with the coating station. Once the lenses (10) have dried, they are loaded into a rotating dome (24) such as those known in the art for use in association with a vacuum deposition chamber (26). (See FIGS. 3 and 4.) Once the rotating dome (24) has been positioned within the vacuum deposition chamber (26), the deposition chamber (26) is slowly evacuated to a pressure of about $10^{-4}$ to $10^{-6}$ torr, preferably $10^{-6}$ torr or less, to reduce undesired expansion or contraction associated with a change in temperature. The lower vacuum aids in degassing the lenses (10), removing any moisture therefrom, and reducing variance in the dimensions and other characteristics of the lenses (10).

Once a vacuum has begun being pulled within the vacuum chamber (26), the rack (24) is rotated to further reduce temperature effects on the lenses (10). An electronic beam gun, such as those known in the art, is used to evaporate a set of deposition coating materials provided within the vacuum chamber (26). The evaporated coating materials deposit on the lenses (10) until an appropriate thickness has been applied, in one, two, or three layers. The deposited coating materials are preferably applied to a total thickness of about 270-278 nm, and most preferably do not exceed a thickness of 278 nm. A quartz crystal monitor (28) preferably is used to precisely measure the thickness of the deposition layer of coating materials. Those of skill in the art will appreciate that a variety of commercially-available vacuum deposition/coating machines available for use within the scope of the present invention.

In the preferred embodiment, the coating preferably is a combination of three or more compounds selected from the group consisting of: $Al_2O_3$, $Bi_2O_3$, $CeO_2$, $Cr_2O_3$, $Eu_2O_3$, $Fe_2O_3$, $HfO_2$, $In_2O_3$, $MgO$, $MoO_3$, $La_2O_3$, $Nd_2O_3$, $PbO$, $Pr_6O_{11}$, $SiO_2$, $SiO$, $Sm_2O_3$, $SnO_2$, $Ta_2O_5$, $TiO_2$, $Ti_4O_7$, $Ti_3O_5$, $Ti_2O_3$, $TiO$, $Ta_2O_5$, $WO_3$, $Y_2O_3$, $ZrO_2$, $ZnO$, $BaF_2$, $CaF_2$, $CeF_3$, $AlF_3$, $BaF_2$, $CaF_2$, $CaF_3$, $LaF_3$, $LiF$, $MgF_2$, $NaF$, $Na_3AlF_6$, $Na_5Al_3F_{14}$, $NdF_3$, $PbF_2$, $SmF_3$, $SrF_2$, $YF_3$. Preferably, the combination contains at least one oxide, and most preferably a layer deposited directly on the lenses 10 includes an oxide. Preferred combinations may include two of the above-identified oxides, one of the above-identified oxides combined with one of the above-identified fluorides, three of the above-identified oxides, two of the above-identified oxides combined with one of the above-identified fluorides, or one of the above-identified oxides and three of the above-identified fluorides. While in the preferred embodiment, the coatings are applied sequentially, the coatings may be simultaneously applied, or applied in overlapping layers.

Figure 5:
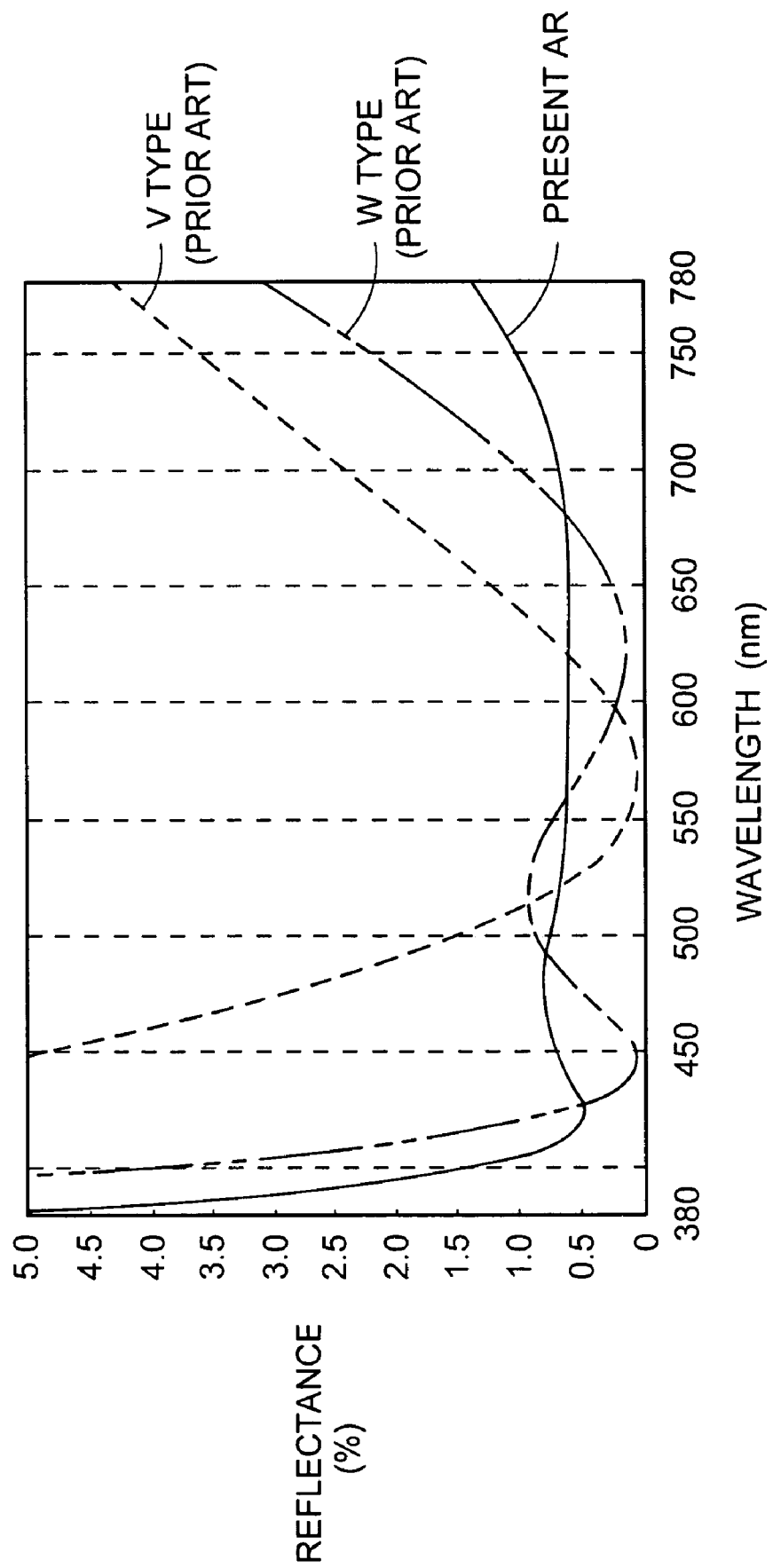
FIG. 5 depicts, in graphic form, the reflectance spectra of an antireflective coating embodiment of the present invention contrasted with prior art antireflective coatings.

In one embodiment, the coating may include a first layer of oxide coating and a second layer of oxide coating, wherein each of the oxide coating layers includes an oxide (preferably three oxides) selected from $Al_2O_3$, $Bi_2O_3$, $CeO_2$, $Cr_2O_3$, $Eu_2O_3$, $Fe_2O_3$, $HfO_2$, $In_2O_3$, MgO, $MoO_3$, $La_2O_3$, $Nd_2O_3$, PbO, $Pr_6O_{11}$, $SiO_2$, SiO, $Sm_2O_3$, $SnO_2$, $Ta_2O_5$, $TiO_2$, $Ti_4O_7$, $Ti_3O_5$, $Ti_2O_3$, TiO, $Ta_2O_5$, $WO_3$, $Y_2O_3$, $ZrO_2$, and ZnO. In another embodiment, the coating may include a first layer of oxide coating selected from $Al_2O_3$, $Bi_2O_3$, $CeO_2$, $Cr_2O_3$, $Eu_2O_3$, $Fe_2O_3$, $HfO_2$, $In_2O_3$, MgO, $MoO_3$, $La_2O_3$, $Nd_2O_3$, PbO, $Pr_6O_{11}$, $SiO_2$, SiO, $Sm_2O_3$, $SnO_2$, $Ta_2O_5$, $TiO_2$, $Ti_4O_7$, $Ti_3O_5$, $Ti_2O_3$, TiO, $Ta_2O_5$, $WO_3$, $Y_2O_3$, $ZrO_2$, and ZnO, and a second layer of fluoride coating selected from $BaF_2$, $CaF_2$, $CeF_3$, $AlF_3$, $BaF_2$, $CaF_2$, $CaF_3$, $LaF_3$, LIF, $MgF_2$, NaF, $Na_3AlF_6$, $Na_5Al_3F_4$, $NdF_3$, $PbF_2$, $SmF_3$, $SrF_2$, and $YF_3$. In still another embodiment, the coating may include a first and second layers of oxide coating each selected from $Al_2O_3$, $Bi_2O_3$, $CeO_2$, $Cr_2O_3$, $Eu_2O_3$, $Fe_2O_3$, $HfO_2$, $In_2O_3$, MgO, $MoO_3$, $La_2O_3$, $Nd_2O_3$, PbO, $Pr_6O_{11}$, $SiO_2$, SiO, $Sm_2O_3$, $SnO_2$, $Ta_2O_5$, $TiO_2$, $Ti_4O_7$, $Ti_3O_5$, $Ti_2O_3$, TiO, $Ta_2O_5$, $WO_3$, $Y_2O_3$, $ZrO_2$, and ZnO, and a third layer of fluoride coating selected from $BaF_2$, $CaF_2$, $CeF_3$, $AlF_3$, $BaF_2$, $CaF_2$, $CaF_3$, $LaF_3$, LIF, $MgF_2$, NaF, $Na_3AlF_6$, $Na_5Al_3F_4$, $NdF_3$, $PbF_2$, $SmF_3$, $SrF_2$, and $YF_3$. In still yet another embodiment, the coating may include a first layer of oxide coating selected from $Al_2O_3$, $Bi_2O_3$, $CeO_2$, $Cr_2O_3$, $Eu_2O_3$, $Fe_2O_3$, $HfO_2$, $In_2O_3$, MgO, $MoO_3$, $La_2O_3$, $Nd_2O_3$, PbO, $Pr_6O_{11}$, $SiO_2$, SiO, $Sm_2O_3$, $SnO_2$, $Ta_2O_5$, $TiO_2$, $Ti_4O_7$, $Ti_3O_5$, $Ti_2O_3$, TiO, $Ta_2O_5$, $WO_3$, $Y_2O_3$, $ZrO_2$, and ZnO, and second, third, and fourth layers of fluoride coating each selected from $BaF_2$, $CaF_2$, $CeF_3$, $AlF_3$, $BaF_2$, $CaF_2$, $CaF_3$, $LaF_3$, LIF, $MgF_2$, NaF, $Na_3AlF_6$, $Na_5Al_3F_4$, $NdF_3$, $PbF_2$, $SmF_3$, $SrF_2$, and $YF_3$. In still other embodiments, the above-described combinations of oxides and fluorides may be simultaneously applied rather than as sequential coatings. For each of the embodiments described, the oxides and/or fluorides in the different coating layers may be the same as or different than the oxides and/or fluorides in other coating layers. Each of these coating combinations, when used with the methods of the present invention provided unexpected improvements in the reduction of reflectance from lenses to which the coating combinations were applied. The improvement over prior art coatings is illustrated in FIG. 5, which shows the breadth and depth of reflectance reduction of the present coating over the prior art coatings.

In the preferred embodiment, the deposition layers are applied in a manner which reduces transmittance through the lens (10) of specific range of visible light wavelengths and enhances perceived contrast/image sharpness. The deposition layers are also preferably applied in a manner which reduces the reflection of a broad range of visible light wavelengths contacting the interior surface (20) of the lens (10) through wave interference associated with reflecting light waves from the different deposition layers. The deposition layers, however, most preferably are applied in a manner which allows a predetermined amount of desirable, high contrast visible light wavelengths and to penetrate through the lens (10). The composition, thickness and application order of the deposition layers may be adjusted as desired to obtain the desired contrast and antireflective properties. In preferred embodiments, the polarizing film (16) blocks most reflected light, which is itself typically polarized and out of phase relative to the polarizing film (16), and direct light is polarized by the film with the known glare-reducing benefits provided thereby.

The antireflective coating materials may be applied in any desired combination and thickness within the scope of the present invention. Preferably, the coatings are applied in a manner (e.g., at a thickness) which reduces reflectance along the interior surface (40) of the lens (10), and which reduces the transmittance of light waves in a manner which increases contrast associated with images viewed by a user through the lenses (10). It is desirable to provide the antireflective coatings in a manner which does not impart a colored tint to the lens (10). The antireflective coatings are preferably provided in a manner that are colorless in the visible spectrum, or which merely darken slightly or impart a neutral color tone to the lenses (10). It is preferable to reduce reflectance below 5% across most visible wavelengths of light (400-700 nm), and most preferable to reduce reflectance below 1.5% in that wavelength range. In addition, it is preferable to reduce the reflection of near ultraviolet light (380-400 nm wavelength) and near infrared (700-800 nm wavelength) below 5%. As shown in FIG. 5, the present antireflective coating is more effective than the prior art V-type and W-type antireflective coatings at reducing reflectance across the visible spectrum, as well as the near-ultraviolet and near-infrared spectra.

The coating of the present invention most preferably does not present any significant amount of false color or color distortion. The antireflective coating may be placed on any or all lens surfaces, but preferably is applied at least to the surface (20) of the lens (10) configured to be nearest the user.

If it is desired to obtain the antireflective without the need for a high contrast coating, two of the materials may be combined instead of three. Preferably, either two of the oxides may be combined, or one oxide combined with one fluoride in a manner described above. If the high contrast coating is desired in association with the antireflective coating, then three or four materials are preferably utilized, either three oxides, two oxides and one fluoride, or one oxide and three fluorides. For example, $Cr_2O_3$ may be combined as a coating with $TiO_2$ and $SiO_2$. Alternatively, the combination can be made of $Cr_2O_3$ combined with $TiO_2$ and $MgF_2$. Although one of ordinary skill in the art may, of course, realize that not all combinations of the foregoing fluorides and oxides may be possible to develop a suitable neutral set of coatings with antireflective and/or high contrast properties. The coatings may be combined as desired, depending on the refractive index of the lens material, the refractive lens (10), the refractive index of a hardcoating, the thickness of the desired antireflective coatings, and the number of reflective coatings needed to achieve the desired antireflective property for the lens (10) and/or the desired high contrast properties, such as blocking wavelengths in the blue spectrum.

In one example of a preferred embodiment, a lens (10) according to the present invention is deposited with an antireflective coating (48) of 10 percent by weight of $ZrO_2$, 25 percent by weight of $SiO_2$ and 65 percent by weight of $Cr_2O_3$.

The vacuum is preferably maintained during the coating process to a pressure of between $10^{-5}$ and $10^{-6}$ torr to reduce the influence of impure gas and to reduce the effects associated with excess moisture of the lenses (10). Preferably, the inside of the vacuum chamber (26) is maintained at a temperature of no more than seventy degrees Celsius to reduce the amount of gas emanating from the lenses (10). After the coating process has been completed, the lenses (10) are provided with a hardcoating in a manner such as is known in the art to protect the coating and increase the abrasion resistance of the lenses.

The foregoing description and drawings merely explain and illustrate the invention, and the invention is not limited thereto, except insofar as the claims are so limited, as those skilled in the art who have the disclosure before them will be able to make modifications and variations therein without departing from the scope of the invention.

We claim:
1. An eyeglass lens system comprising:
  (a) an eyeglass lens;

(b) a first coating bonded to said lens, said first coating comprising $SiO_2$;

(c) a second coating bonded to said lens, said second coating comprising a material selected from the group consisting of $Al_2O_3$, $Eu_2O_3$, $HfO_2$, $MgO$, $MoO_3$, $La_2O_3$, $Nd_2O_3$, $PbO$, $Pr_6O_{11}$, $SiO_2$, $Sm_2O_3$, $WO_3$, and $Y_2O_3$;

(d) wherein said first coating and said second coating do not impart a color to said lens.

2. The eyeglass lens system of claim 1, further comprising a third coating comprising $SiO_2$.

3. The eyeglass lens system of claim 1, wherein said first coating and said second coating are vacuum deposited on said lens.

4. The eyeglass lens system of claim 1, further comprising a third coating comprising a material selected from the group consisting of $Al_2O_3$, $Eu_2O_3$, $HfO_2$, $MgO$, $MoO_3$, $La_2O_3$, $Nd_2O_3$, $PbO$, $Pr_6O_{11}$, $Sm_2O_3$, $WO_3$, $Y_2O_3$, $BaF_2$, $CaF_2$, $CeF_3$, $AlF_3$, $BaF_2$, $CaF_3$, $LaF_3$, $LiF$, $NaF$, $Na_3AlF_6$, $Na_5Al_3F_4$, $NdF_3$, $PbF_2$, $SmF_3$, $SrF_2$, and $YF_3$, wherein said third coating is different than said first coating and different than said second coating.

5. The eyeglass lens system of claim 4, wherein said first coating, said second coating and said third coating are vacuum deposited on said lens and wherein the combination of said first, second and said third coatings does not significantly impart a color to said lens.

6. The eyeglass lens system of claim 2, wherein said first coating, said second coating and said third coating are vacuum deposited on said lens and wherein the combination of said first, second and said third coatings does not significantly impart a color to said lens.

7. The eyeglass lens system of claim 4, further comprising a fourth coating bonded to said lens, said fourth coating comprising a material selected from the group consisting of $BaF_2$, $CeF_3$, $AlF_3$, $BaF_2$, $CaF_2$, $CaF_3$, $LaF_3$, $LIF$, $MgF_2$, $NaF$, $Na_3AlF_6$, $Na_5Al_3FI_4$, $NdF_3$, $PbF_2$, $SmF_3$, $SrF_2$, and $YF_3$, wherein said fourth coating is a different material than first coating, said second coating and said third coating.

8. The eyeglass lens system of claim 1, further comprising a polarizing film disposed on said lens.

9. The eyeglass lens system of claim 1, wherein the lens comprises two lens layers.

10. The eyeglass lens system of claim 9, further comprising a polarizing film disposed between the two lens layers.

11. The eyeglass lens system of claim 9, further comprising a hardcoat layer disposed upon at least one surface.

12. The eyeglass lens system of claim 1, further comprising a hardcoat layer disposed upon at least one surface.

13. A method of manufacturing a lens, comprising the steps of:

(a) providing an eyeglass lens;

(b) coating at least one surface of said eyeglass lens with a first coating comprising $SiO_2$ (c) coating the at least one surface of said eyeglass lens with a second coating comprising a material selected from the group consisting of $Al_2O_3$, $Eu_2O_3$, $HfO_2$, $MgO$, $MoO_3$, $La_2O_3$, $Nd_2O_3$, $PbO$, $Pr_6O_{11}$, $Sm_2O_3$, $WO_3$, $Y_2O_3$, $BaF_2$, $CaF_2$, $CeF_3$, $AlF_3$, $BaF_2$, $CaF_3$, $LaF_3$, $LiF$, $NaF$, $Na_3AlF_6$, $Na_5Al_3F_4$, $NdF_3$, $PbF_2$, $SmF_3$, $SrF_2$, and $YF_3$;

(d) wherein said second coating is a different material than said first coating; and (e) wherein said first coating and said second coating do not significantly impart color to said lens.

14. The method of claim 13, further comprising placing said eyeglass lens under a vacuum less than atmospheric pressure when coating said eyeglass lens with said first coating and said second coating.

15. The method of claim 13, further comprising placing said eyeglass lens under a vacuum of less than $10_{-4}$ torr when coating said eyeglass lens with said first coating and said second coating.

16. The method of claim 13, further comprising coating said eyeglass lens with at least a portion of said first coating at the substantially same time as coating said eyeglass lens with at least a portion of said second coating.

17. The method of claim 13, further comprising coating said eyeglass lens with a third coating comprising a material selected from the group consisting of $Al_2O_3$, $Eu_2O_3$, $HfO_2$, $MgO$, $MoO_3$, $La_2O_3$, $Nd_2O_3$, $PbO$, $Pr_6O_{11}$, $Sm_2O_3$, $WO_3$, $Y_2O_3$, $BaF_2$, $CaF_2$, $CeF_3$, $AlF_3$, $BaF_2$, $CaF_3$, $LaF_3$, $LiF$, $NaF$, $Na_3AlF_6$, $Na_5Al_3F_4$, $NdF_3$, $PbF_2$, $SmF_3$, $SrF_2$, and $YF_3$, wherein said third coating is a different material than said first coating and said second coating.

18. The method of manufacturing a lens of claim 17, further comprising coating said eyeglass lens with a fourth coating comprising a material selected from the group consisting of $AlF_3$, $BaF_2$, $CaF_2$, $CaF_3$, $LaF_3$, $LIF$, $MgF_2$, $NaF$, $Na_3AlF_6$, $Na_5Al_3F_4$, $NdF_3$, $PbF_2$, $SmF_3$, $SrF_2$, and $YF_3$, wherein said fourth coating is a different material than said first coating, said second coating and said third coating.

19. A method of manufacturing a lens, comprising:

(a) providing an eyeglass lens;

(b) placing said eyeglass lens under a vacuum of at least $10^{-4}$ torr;

(c) heating said eyeglass lens to a temperature of at least 40° degrees Celsius;

(d) providing a first coating of a material comprising;

(e) coating said eyeglass lens with said first coating while said eyeglass lens is under said vacuum;

(f) providing a second coating of a material selected from the group $Al_2O_3$, $Eu_2O_3$, $HfO_2$, $MgO$, $MoO_3$, $La_2O_3$, $Nd_2O_3$, $PbO$, $Pr_6O_{11}$, $Sm_2O_3$, $WO_3$, $Y_2O_3$, $BaF_2$, $CaF_2$, $CeF_3$, $AlF_3$, $BaF_2$, $CaF_3$, $LaF_3$, $LiF$, $NaF$, $Na_3AlF_6$, $Na_5Al_3F_4$, $NdF_3$, $PbF_2$, $SmF_3$, $SrF_2$, and $YF_3$;

(g) coating said eyeglass lens with said second coating while said eyeglass lens is under said vacuum; and (h) wherein said second coating is a different material than said first coating; and (i) wherein said first coating and said second coating do not significantly impart color to said lens.

20. Sunglasses comprising:

(a) at least one lens;

(b) a first coating bonded to said lens, said first coating comprising an oxide material comprising $SiO_2$, (c) a second coating bonded to said lens, said second coating comprising a material selected from the group consisting of $Al_2O_3$, $Eu_2O_3$, $HfO_2$, $MgO$, $MoO_3$, $La_2O_3$, $Nd_2O_3$, $PbO$, $Pr_6O_{11}$, $Sm_2O_3$, $WO_3$, $Y_2O_3$, $BaF_2$, $CaF_2$, $CeF_3$, $AlF_3$, $BaF_2$, $CaF_3$, $LaF_3$, $LiF$, $NaF$, $Na_3AlF_6$, $Na_5Al_3F_4$, $NdF_3$, $PbF_2$, $SmF_3$, $SrF_2$, and $YF_3$;

(d) wherein said second coating is a different material than said first coating; and (e) wherein said first coating and said second coating do not impart a color to said lens.

* * * * *